US011495219B1

(12) United States Patent
Srivatsa et al.

(10) Patent No.: US 11,495,219 B1
(45) Date of Patent: Nov. 8, 2022

(54) INTERACTING WITH A VIRTUAL ASSISTANT TO RECEIVE UPDATES

(71) Applicant: Amazon Technologies, Inc., Seattle, WA (US)

(72) Inventors: Sunitha Kalkunte Srivatsa, Seattle, WA (US); Maayan Aharon, Seattle, WA (US); Aakarsh Nair, Lynnwood, CA (US); Nithya Venkataraman, Santa Clara, CA (US); Lohit Bijani, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 114 days.

(21) Appl. No.: 16/588,627

(22) Filed: Sep. 30, 2019

(51) Int. Cl.
*G10L 15/22* (2006.01)
*G10L 25/54* (2013.01)
*G06Q 10/10* (2012.01)
*G10L 15/26* (2006.01)

(52) U.S. Cl.
CPC .......... *G10L 15/22* (2013.01); *G06Q 10/1095* (2013.01); *G06Q 10/1097* (2013.01); *G10L 25/54* (2013.01); *G06Q 10/109* (2013.01); *G06Q 10/1093* (2013.01); *G10L 15/26* (2013.01); *G10L 2015/223* (2013.01); *G10L 2015/225* (2013.01)

(58) Field of Classification Search
CPC ... G06Q 10/109; G06Q 10/1093; G10L 15/26
See application file for complete search history.

(56) References Cited

U.S. PATENT DOCUMENTS

| 2002/0154178 | A1* | 10/2002 | Barnett | G06Q 30/02 715/853 |
| 2008/0235018 | A1* | 9/2008 | Eggen | G10L 15/26 704/E15.045 |
| 2009/0307189 | A1* | 12/2009 | Bobbitt | G06F 16/00 |
| 2010/0169146 | A1* | 7/2010 | Hoyne | G06Q 10/109 705/7.21 |
| 2011/0106892 | A1* | 5/2011 | Nelson | G06Q 10/109 709/206 |

\* cited by examiner

*Primary Examiner* — Feng-Tzer Tzeng
(74) *Attorney, Agent, or Firm* — Lee & Hayes, P.C.

(57) ABSTRACT

Technologies are disclosed for interacting with a virtual assistant to request updates associated with one or more events and/or perform actions. According to some examples, a user may use their voice to interact with a virtual assistant to receive updates relating to events occurring during a certain period of time. For example, a user may request an update associated with one or more events occurring that day. The system may access data sources (e.g., calendar services, email services, etc.) to obtain data associated with the events, tag the events according to one or more conditions indicated by the data, and/or rank the events according to the tags. In addition, to resolve conditions associated with the events, the virtual assistant may also include options in the update to perform certain actions and/or to provide response data. The virtual assistant may generate the update and audibly provide the update to the user.

20 Claims, 9 Drawing Sheets

INTERACTING WITH A VIRTUAL ASSISTANT TO RECEIVE UPDATES

BACKGROUND

Today, users may interact with voice-controlled devices to assist in the performance of tasks within the home or workplace. As such, voice-controlled devices may often be referred to as virtual assistants. For example, users may provide verbal commands to the virtual assistant requesting tasks to be performed, such as turning smart devices on and off, answering questions, playing music, and the like. In turn, the virtual assistant may be configured to parse the verbal commands to execute the requested tasks. However, existing virtual assistants are limited in the types of information that they can provide.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
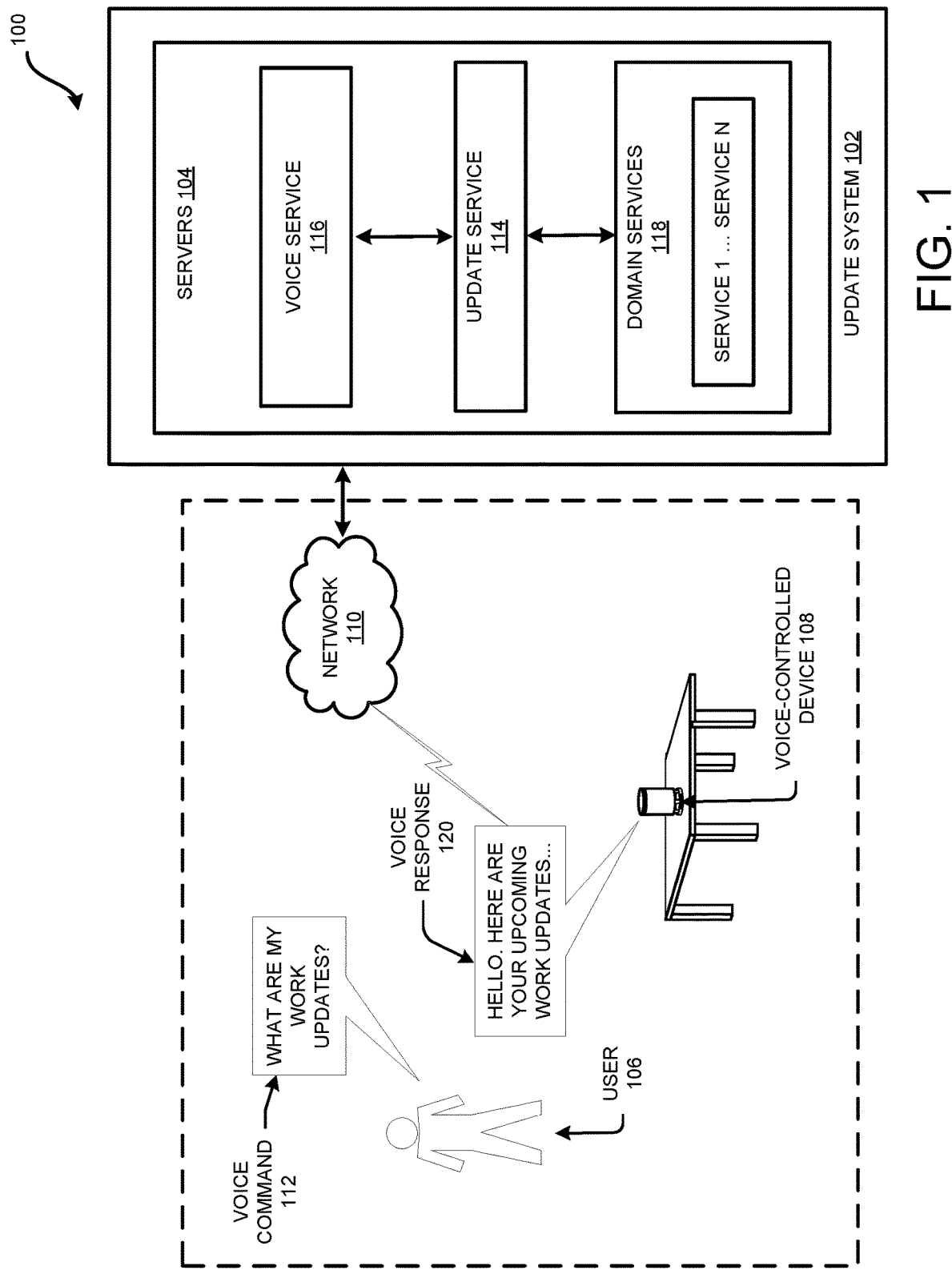
FIG. 1 is a software and network architecture diagram showing aspects of the configuration and utilization of an update system for interacting with a virtual assistant.

The following detailed description is directed to technologies for interacting with a virtual assistant, via a voice-controlled device, to receive updates and perform actions. According to some examples, a user may use their voice to interact with a virtual assistant to receive updates, or a briefing, relating to one or more events associated with the user and/or to perform one or more actions. For example, a user may interact with a virtual assistant to request an update, or status, for upcoming events including information associated with events occurring during a certain time period, such as the current day, and/or to perform actions associated with the events, such as rescheduling an event or adding a location to the information associated with the event.

In some instances, conventional virtual assistants may be able to access or receive information from various services (e.g., email, calendar, etc.) in order to provide updates, or a briefing, regarding events associated with the user. However, conventional virtual assistants may be limited in the information they can provide and the manner in which they can provide the information. For example, the virtual assistant may provide updates containing information that is not tailored to a user's preferences, regarding events lacking pertinent information, regarding events having conflicts, and/or that is difficult for the user to decipher. As a result, the virtual assistant may provide updates that are not optimized and/or provide ineffective information.

Existing virtual assistants for assisting with tasks may be limited in the information they can provide, as well as the manner in which the information is provided. Further, existing virtual assistants may not be able to optimize or categorize the information that is received from various data services, such as an email service, and may therefore provide updates that are ineffective and/or inefficient. For example, conventional virtual assistants may simply provide basic information regarding events that are explicitly identified in the request. However, this basic information may be lacking pertinent contextual information (e.g., missing contact or location information), may have scheduling conflicts (e.g., two events may occur at the same time), and/or may not be tailored for efficiency and/or to the user's preferences.

The techniques described herein for providing updates to users may help improve the content being provided to the user to ensure that the user is receiving useful, effective updates. For example, described herein are techniques for tagging data acquired from the different services, thereby allowing the system to prioritize event information (e.g., prioritize updates based on conditions associated with the events, such as conflicts, based on user preferences, etc.), note conflicts and/or missing information, and/or provide recommendations for resolving issues associated with the events via the virtual assistant. In this way, the system can ensure that the event information provided to the user is optimized and avoid presenting unnecessary and/or inefficient updates.

In examples, the update system described herein may receive audio from a user for use by the virtual assistant in generating updates. For example, the virtual assistant may be configured with one or more microphones configured to receive audio from a user. As an example, the user may utter a phrase such as "What are my work updates?", "What is on my schedule this morning?", and the like. Alternatively, or in addition, the virtual assistant may be configured to automatically ask the user if they would like to hear an update in response to some event, such as the user turning the device on, a time of day, and the like.

The system may then be configured to apply speech recognition techniques (e.g., automated speech recognition (ASR)) and natural language processing (NLP) (e.g., natural language understanding (NLU)) to an audio signal associated with the audio to identify the voice command, where the audio signal may be generated by the microphone(s) of the device and may represent the audio. For example, the system may be configured to use ASR to determine one or more words or phrases spoken by the user and then use NLP and/or natural language understanding (NLU) techniques in order to determine an intent associated with the voice command (e.g., the words or phrases). In this instance, the intent may correspond to a request for an update regarding one or more events associated with the user.

In examples, the system may then obtain data associated with one or more events from domain services associated with the user. For example, the domain services may include calendar service(s), email service(s), reminder service(s), and/or other services. In response to identifying the user command requesting the update, the system may access and/or receive data from one or more of the domain services associated with the one or more events. For example, the update may be limited to events occurring during a period of time (e.g., occurring the same day and/or during a time frame) and/or a limited number of events (e.g., the update may only include information associated with three events occurring that day).

As an example, the system may receive data from a calendar service that identifies the first three events occurring during the day of the user request. The system may further include a rules database including rules associated with each domain service. The system may identify one or more rules associated with the calendar service and may use the rule(s) to tag each event based on the data associated with the event. For example, each tag may be utilized to associate a particular condition with the event. For example, the tag may indicate a day/time associated with the event, that the event has a conflict, a duration of the event, that event information is missing, that the event has been canceled, and/or that the user has not replied to the event. The system may utilize the condition tags to rank the events.

In examples, the system may generate the update associated with the one or more events for presentation to the user. The update may include a listing of the event(s) and/or information associated with the event(s). For example, based on the event(s) being tagged according to the time/date of occurrence, the listing may include a chronological list of the events occurring during a certain period of time after the request was made by the user. In other examples, the system may rank an event tagged as having a conflict higher than an event occurring sooner in the day. In this way, the system may present the event having the conflict as higher priority so the user is aware of the conflict. The generated update may be presented to the user via an audible output, as well as visually via a user interface or display. For example, the system may utilize the one or more microphones to audibly output the update to the user. As an example, in response to the user requesting "What are my updates?" the system may respond with "Your next meeting is at 7 AM today." In another example, if the system identifies two events tagged as having a conflict, the system may respond with "You have two overlapping meetings coming up. The first meeting is at 7 AM and the second meeting is at 7:15 AM." In this way, the system may generate updates that provide limited information to the user that is more easily parsed for pertinent information. Further, the system may utilize fewer resources by presenting updates that eliminate unnecessary and/or ineffective information.

In some examples, the system may further generate the update based on user preferences. For example, the system may determine user preferences based on historical user interactions with the system, feedback data (e.g., indications that the user likes or dislikes previous updates), and/or explicit preferences selected by the user. Based on the determined or learned preferences, the system may adjust the ranking of the event(s). For example, if the system determines that the user has indicated that he/she prefers to receive updates associated with events missing information, the system may rank those events tagged as having a conflict above other events. In this way, the system may tailor the updates to the user's preferences and present the user with more effective updates that are more likely to be of value to the user.

In still further examples, the system may determine a recommendation for resolving certain conditions. For example, if, based on the event data and the rule associated with the domain service, the system has tagged an event as missing a response, the system may include a recommendation in the update to provide a response to the event. As an example, the update may be generated to respond to the user request with a prompt to provide a response such as, such as "You have an event occurring at 2 PM that you have not replied to, would you like to accept the invitation or decline?" The system may then be configured to receive response data from the user and utilize the response date to update the event.

As described herein, many users may prepare for the upcoming day the evening before, or early in the morning before the workday has begun. In this way, the user can ensure that they are up to date on any last-minute changes to the schedules or the way their upcoming events should be prioritized. However, these time periods can often be the busiest times for users. For example, these time periods may be when the user is preparing themselves or their families for the upcoming day's events. As such, customers may struggle to check their devices, such as phone or email, to gather information regarding upcoming events. By providing audible updates that are tailored to the user's needs and/or preferences, users may use only voice commands to gather updates regarding upcoming events and to prepare for the day's events.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram 100 showing aspects of the configuration and utilization of an update system 102 for interacting with a virtual assistant to receive event updates and perform actions. It is to be appreciated that the environment 100 is merely illustrative and that the various configurations disclosed herein can be utilized in many different types of computing environments.

As described herein, to provide the update described herein, among other functionalities, the update system 102 may include one or more servers 104. The servers 104 can execute software components to provide the services described herein, including update functionality using a virtual assistant and different services provided by a service provider and/or another entity. The software components can execute on a single server 104 or in parallel across multiple servers in the update system 102. In addition, a software component can consist of subcomponents executing on different servers 104 or other computing devices in the update system 102. Various components can be implemented as software, hardware, or any combination of the two. In this regard, it is to be appreciated that the update system 102 shown in FIG. 1 has been simplified for discussion purposes and that many additional software and hardware components can be utilized.

In examples, a user 106 of the update system 102 can utilize a virtual assistant, via a voice-controlled device 108 or some other input device, to access the update system 102 through a network 110. Generally, a "virtual assistant" as used herein refers to software and/or hardware that receives input from a user (e.g., a voice command, a question, etc.) and completes tasks for, or provides information to, the user. As described herein, the virtual assistant is configured to understand natural language voice commands and complete tasks for the user, such as receiving/providing update information. The user 106 can be an individual that desires to receive updates associated with one or more events and have actions performed that are associated with the update system 102, such as modifying event information, confirming attendance, and the like. In some examples, the user 106 is a customer of the service provider.

The voice-controlled device 108 is an input device configured to receive voice queries/commands/utterances (which may collectively be referred to herein as "voice commands") from the user 106 and provide data to a virtual assistant that may generate updates. The voice-controlled device 108 may include one or more microphones for generating audio signals that represent, or are otherwise associated with, sound from an environment 100, including voice utterances of a user.

The voice-controlled device 108 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, or any other type of computing device capable of connecting to the network 110 and communicating with the update system 102. In other configurations, the voice-controlled device 108 may be configured to communicate with one or more other devices to receive voice commands from users and/or perform processing related to functionality of the update system 102.

In some configurations, the voice-controlled device 108 may be configured to perform automatic speech recognition (ASR) on the audio signals to identify voice commands therein or may be configured to provide the audio signals to another device (e.g., a remote service such as the update system 102) for performing the ASR on the audio signals for identifying the voice commands. As used herein, performing ASR on an audio signal to identify a voice command may include translating speech represented in the audio signal into text and analyzing the text to identify the voice command. Analysis of the text may be performed, locally by the voice-controlled device 108 and/or remotely by the one or more servers 104 (or other remote services), using natural language processing (NLP) and/or natural language understanding (NLU) techniques in order to determine an intent associated with the voice command. In other examples, ASR and/or NLP and/or NLU may be performed by a different computing system and/or service.

Within FIG. 1, the user 106 may interact with the voice-controlled device 108 within the environment 100 by using voice commands. For instance, if the user 108 would like to receive information regarding events occurring on a certain day, such as the current day, the user 108 may issue a voice command 112 (e.g., "What are my updates?") to the voice-controlled device 108. Many other voice commands 112 can be utilized to interact with the update system 102. For example, voice commands 112 requesting additional information, requests to modify an event, and the like may be used. For example, the voice commands 112 may include utterances such as "Can I hear more details?", "Please reply yes to the event", and the like may be used. In each example, the voice-controlled device 108 may interact with one or more remote services, discussed below, to generate the updates and perform actions. In some embodiments, the voice command may not include an identity or other identifying information associated with events associated with the user 106 (e.g., meetings, telephone calls, teleconferences, activities, meals, etc.).

As discussed herein, according to some configurations, the update system 102 generates updates including information regarding one or more events associated with the user and/or generates recommendations for resolving conditions associated with the event(s). For example, the update system 102 may generate updates including a prioritized, or optimized, listing of events and including information associated with the events, such as a time/date of occurrence, conflicts, missing information, and the like. In addition, the update system 102 may further generate recommendations or prompt the user to provide response data associated with resolving conditions associated with the events (e.g., a prompt requesting that the user accept or decline an event that has not been responded to).

As illustrated, the voice-controlled device 108 may couple with an update service 102 over a network 112. The network 112 may represent an array or wired networks, wireless networks (e.g., WiFi), or combinations thereof. The update system 102 may generally refer to a network-accessible platform implemented as a computing infrastructure of processors, storage, software, data access, and so forth that is maintained and accessible via the network 112, such as the Internet. These services may not require end-user knowledge of the physical location and configuration of the system that delivers the services. Common expressions associated with these remote services, such as the update system 102, include "on-demand computing", "software as a service (SaaS)", "platform computing", "network accessible platform", and so forth.

As illustrated, the update system 102 may comprise one or more network-accessible resources, such as servers 104. These resources comprise one or more processors and computer-readable storage media executable on the processors. In some configurations, the user 106 may be authenticated before interacting with the update service 102. In some examples, the voice-controlled device 108 is awakened upon identifying a predefined wake word. In other configurations, the virtual assistant provided via the voice-controlled device 108 may be awoken using some other technique. After being awakened, the voice-controlled device 108 may upload an audio signal representing sound captured in the environment 100 to the update system 102 over the network 110. In response to receiving this audio signal, a voice service 116 may perform ASR, NLU, and/or NLP on the audio signal to identify one or more user voice commands therein. For instance, in the illustrated example, the voice service 116 may identify the user 106 requesting an update. In some embodiments, an upcoming event associated with the user may not be identified within the audio signal and/or the upcoming event may not be identifiable as a result of processing (e.g., ASR, NLU, and/or NLP) the audio signal. Accordingly, as a result of processing the audio signal, the update service 102 may not be able to identify or otherwise determine various upcoming events (e.g., meetings, telephone calls, teleconferences, training sessions, meals, etc.) associated with the user.

The network 110 can be a local-area network ("LAN"), a wide-area network ("WAN"), the Internet, or any other networking topology known in the art that connects the user devices to the update system 102. The user 106 can use an application (not shown) executing on voice-controlled device 108 to access and utilize the update service 114 functionality provided by the servers 104. In some examples, the application is a web browser application (not shown), such as the Amazon® Silk® web browser, or some other web browser. Generally, a web browser application exchanges data with the servers 104 in the update system 102 using the hypertext transfer protocol ("HTTP") over the network 112. The application might also be a stand-alone client application configured for communicating with the servers 104.

The client application can also utilize any number of communication methods known in the art to communicate with the update system 102 and/or the servers 104 across the network 110, including remote procedure calls, SOAP-based web services, remote file access, proprietary client-server architectures, and the like. According to some configurations, the application may provide a user interface that can be utilized by the user 106 to configure settings associated with the update service 114 and/or the voice-controlled device 108. Typically, a user 106 interacts with the voice-controlled device 108 using speech that is captured by one or more microphones of the voice-controlled device 108.

The voice service 116, or some other component may process a corresponding audio signal associated with the audio data/voice command to determine words within the voice command (using automatic speech recognition techniques—ASR) and to determine an intent of the user 106 (natural language processing techniques—NLU). Based on the identified words/intent, the voice service 116 can determine whether the voice command is related to the update service 114 and/or some other service or functionality.

In the illustrated example, the user 108 has uttered the phrase, or voice command 112, "What are my work updates?" to the voice-controlled device 108. Upon receipt of the voice command 112, the voice-controlled device 108, and or the voice service 116, may apply speech recognition techniques to identify the intent of the voice command 112. For example, the voice command 112 may be transmitted, via the network 110, to the voice service 116 for processing. In examples, the processing may include identify an intent associated with the voice command 112, such as the request for a work update.

Upon recognizing the request for a work update, the service 114 may be configured to access various data sources, such as domain services 118 (e.g., email services, calendar services, reminder services, etc.). In some examples, the domain services 118 may be selected or authorized by the user 108 or may be preconfigured by the update system 102. For example, the user 108 may authorize one or more domain services 118 to determine, utilize, and/or provide event data associated with events scheduled for the user 108. As an example, the calendar service may provide the update service 114 with information regarding one or more events scheduled for the user 108 on the day the voice command 112 was uttered.

In examples, the domain service 118 may provide the update service 114 with, and/or the update service 114 may access, event data associated with the one or more events. In addition, the update service 114 may store a rules database (not shown) including rules for each domain service (service 1 . . . service N). The rules may be utilized to tag each event according to a condition associated with the event. For example, the rules may be utilized to tag an event according to the time/date, whether the event has a conflict, is missing information, has been canceled, has not been replied to, the duration of the event, and the like. Based on the tag(s) associated with the event, the update service 114 may rank the event(s) occurring during a time period according to their importance. For example, if an event has a conflict or missing information, the event may be ranked higher than an event that has been canceled. In this way, the user 108 may be provided with an update that includes the most important and pertinent information. In this way, the update service 114 can provide the user 106 with updates that are prioritized in a way that is beneficial to the user 106. As such, the update service 114 can limit the update to information that is of importance to the user and can prevent providing updates including information that is not relevant to the user or providing events that are too lengthy to be efficient.

According to some implementations, the generated update, or voice response 120, may include a first event occurring in the next twenty-four hours, followed by additional events occurring in the next four hours. In some examples, the voice response 120 may include events listed in chronological order. In other examples, the events may be listed according to their ranking. For example, the voice response 120 may be audibly provided via one or more microphones of the voice-controlled device 108, such as an audible statement saying "Hello, here are your upcoming work updates . . . " and may proceed to list the event information according to the ranking.

In some examples, the voice response 120 may also include an option to hear updates or information associated with additional events beyond the scope of the update. For example, in order to keep the updates succinct, the updates may be limited to information associated with a limited number of events, such as three events. In this instance, the voice-controlled device 108 may be configured to provide the update and include an option to receive additional updates. For example, the voice response 120 may prompt the user 108 with an additional statement of "Would you like to hear more?" The voice-controlled device 108 may be configured to receive additional voice commands, such as "yes" or "no." In response, the update service 114 may be configured to provide additional updates associated with additional events.

In addition, in some examples, the update service 114 may be configured to provide a recommendation and/or a prompt to allow the user 106 to resolve one or more conditions associated with the events. For example, if the update service 114 tags an event as having missing information, such as a lack of response, the generated update may include a statement prompting the user 106 to resolve the condition. For instance, the voice response 120 may include a statement saying "You have events that require a response, would you like to provide a response now?" In response, the user 106 may indicate whether or not they would like to provide a response and the voice-controlled device 108 may continue to interact with the user to receive response information and provide the response information to the domain service for updating the event information.

In still further examples, update service 114 may also be configured to include company-specific updates in the generated update. For example, the update service 114 may be configured to receive and/or access company specific skills to provide company-specific updates, company-specific data (e.g., sales data), and the like. Additionally, the update may include information associated with company messaging systems. For example, the update may include messages from important business contacts and/or groups.

According to some examples, the update service 114 may utilize one or more machine learning mechanisms when generating the updates. In some configurations, information generated by the update service 114, or some other component or device that is located remotely from the voice-controlled device 108, may be stored locally such that if the update service 114 is not accessible for some period of time, the voice-controlled device 108 may access the information that may be processed locally by the voice-controlled device 108 or some other computing device. Additional details regarding the various components and processes described briefly above for interacting with a virtual assistant will be provided below with regard to FIGS. 2-9.

Figure 2:
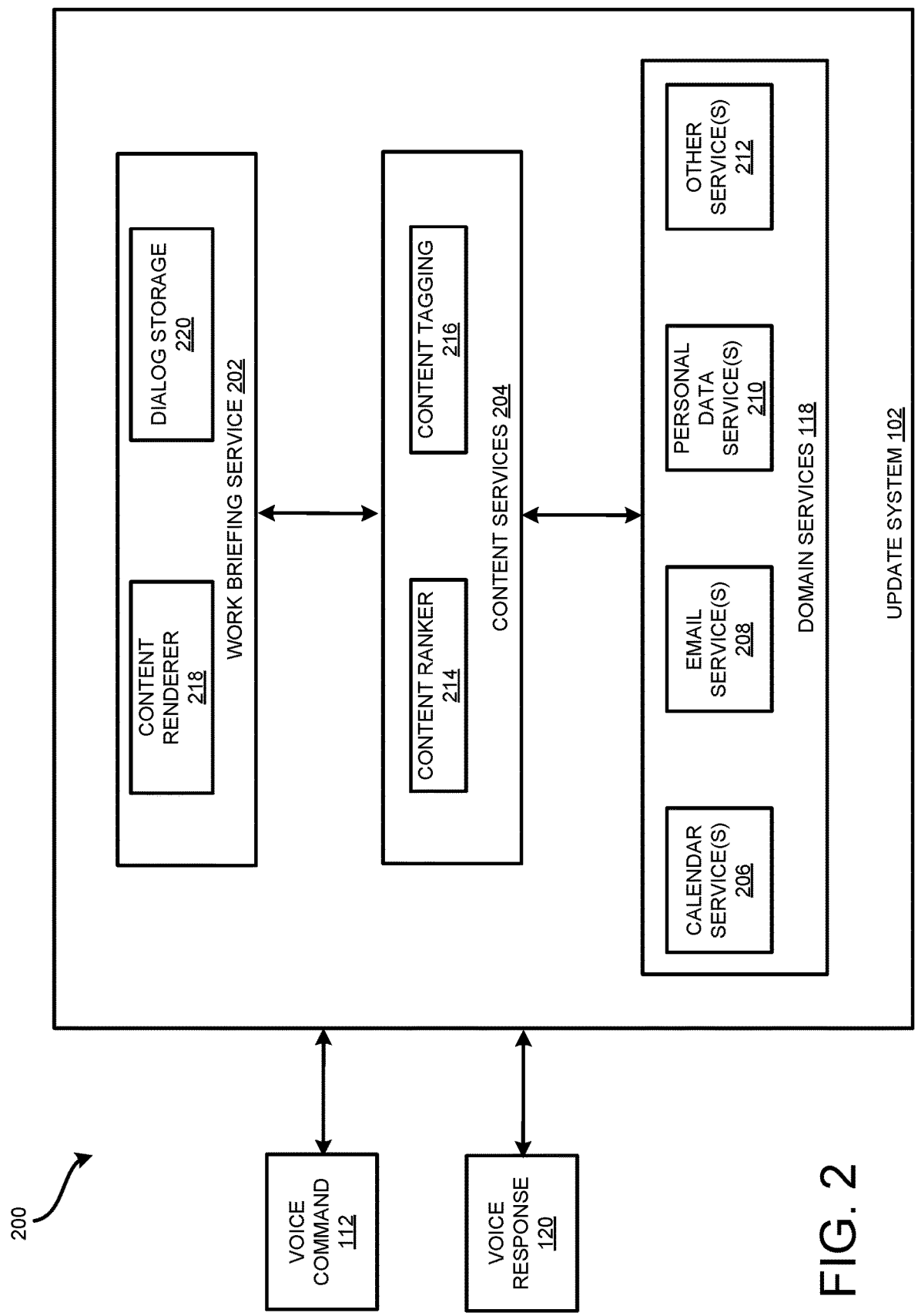
FIG. 2 is a software and network architecture diagram showing aspects of an update system to generate updates using different services associated with a service provider.

FIG. 2 is a software and network architecture diagram showing aspects of an update system 102 to provide information associated with events. As described herein, the update system 102 may include one or more components, such as a work briefing service 202, a content service 204, and/or one or more domain services 118. In some examples, the update service 114, described with respect to FIG. 1, may be comprised of at least the work briefing service 202 and/or the content service 204. It is to be appreciated that the environment 200 is merely illustrative and that the various configurations disclosed herein can be utilized in many different types of computing environments. FIG. 2 is similar to FIG. 1 but provides more details regarding the different services that can be utilized by the update system 102.

In some examples, in response to the update system 102 receiving the voice command 112 indicating that a user has requested an update, the content service 204 may be configured to communicate with the domain services 118 using one or more Application Programming Interfaces (APIs) exposed by one or more of the domain services 118. For example, as described herein, the voice service 116 may include a voice interface that may comprise one or more components configured to receive audio signals generated by the voice-controlled device 108 and perform ASR, NLP, and/or NLU on the audio signals to identify users and voice commands.

In some examples, each domain service may expose one or more APIs that can be used by the content service 130, or some other component, to access functionality and/or data provided by the domain services 118. Alternatively, or in addition, in some examples, the content service 130 may also include a library that enables communication between the content service 130 and the domain services 118. For example, in some instances, the content service 130 may be configured to access and/or receive data from the domain services 118 associated with one or more events. In examples, the domain services 118 may include, but not be limited to, calendar services 206, email services 208, personal data services 210, and/or other services 212. For example, the personal data services 210 may include a personal account associated with a user of the voice-controlled device 108. As such, the personal data services 210 may be configured to allow the user to schedule reminders, events, etc.

From these domain services 118, the content service 204 may acquire data associated with the events including, but not limited to, time (e.g., the time the event is set to occur), date (e.g., the date the event is set to occur), duration (e.g., how long the event is scheduled to last), time of scheduling (e.g., when the event was created), cancelation information (e.g., whether the event has been canceled), reply information (e.g., whether the user and/or additional attendees have accepted, declined, or not yet replied to the event), location information (e.g., a location of the event), contact information (e.g., information for joining or attending the event, such as a conference call number), attendance information (e.g., invited persons), and the like. Utilizing this information, the content service 204 may analyze the data to determine various conditions associated with the events, such as events occurring at conflicting times, events missing information (e.g., missing location, contact information, etc.), events that have not been replied to, quorum issues, canceled meetings, etc.

In examples, the content service 204 may further include at least one of a content ranker component 214 and/or a content tagging component 216. For example, the content tagging component 216 may include a rules database including rules for each domain service of the domain services 118. For example, each of the calendar services 206, email services 208, personal data services 210, and/or other services 212 may be associated with a rule that allows each event from each of the domain services 118 to be tagged according to one or more conditions associated with the events. For example, the content tagging component 216 may parse event data, or information included in the event or body of the event element, to determine one or more tags associated with the event(s).

For example, based on the event data, the content tagging component 216 may tag an event as being a next meeting. For example, the event may be the next meeting found on the calendar of the calendar services 206 and the update may include a statement such as "at <start time> you have <event title> in <location>." The event may also be tagged as being an in-progress meeting. For example, the event may be tagged as in-progress if it started in the last 10 min, or some other predetermined time period, and the update may include a statement such as "You have <' event title> in progress right now." In examples, the event may be tagged as having a conflict. For example, events tagged as having a conflict may include events that the user accepted or tentatively accepted that partially or fully overlap in time/date with another event scheduled. As such the content tagging component 216 may tag each conflicting event as having a conflict and will include in the update the conflict information, such as "You have 2 conflicting meetings at <start time>. They are <event title 1> and <event title 2>," ""You have <number of conflicts> meetings that conflict between <start time> and <end time>," and the like. As an example, the content tagging component 216 may be configured to parse the event data, such as the start time and/or end time associated with the event, to determine possible conflicts for tagging.

Further, in some examples, the event may be tagged as missing location information. For example, an event that has a minimum of two participants (e.g., the organizer, such as the user 106, and another attendee), or some other minimum attendance requirement, and may have a blank location field. In some examples, the content tagging component 216 may also look at event data included in the body of the event information for a conference bridge to be certain there is no virtual location. As such, the update may include a missing location statement, such as "At <10:30 AM> you have <'Productivity Leadership'>. It looks like this event doesn't have a location or conference bridge." Still further, the event may be tagged as canceled. For example, if an event was canceled but the user 106 did not remove it from his/her calendar, the meeting status will have a "canceled" tag (e.g., tagged as canceled based on the information from the calendar services 206). As such, the update may include a statement such as "<eventTitle> at <startTime> was cancelled."

Still further, in some examples, the event may be tagged as lacking response information, or "un-replied." For example, an event may have been sent to the user 106, but the user 106 may never have accepted, tentatively accepted, or declined the event. As such, the update may include a statement such as "You haven't responded to <eventTitle> at <startTime>." In further examples, the event may also be tagged as having a quorum issue. For example, the event information may indicate that the user 106 is the organizer. The content tagging component 216 may be configured to parse the event data to determine if a certain number, or percentage, of invited participants have accepted the event invitation. If the number and/or percentage of acceptances does not exceed a predetermined threshold, the event will be tagged as having a quorum issue. The event may also, in some examples, be tagged as a reminder. For example, the event may be a reminder that the user 106 has scheduled in a personal account associated with the user 106 and the virtual assistant of the voice-controlled device 108. As such, the update may include a statement such as "You have a reminder to <reminderTitle> at <scheduledTime>."

As described herein, an event may have one or more tags. Further, in some examples, certain events may not be tagged and thus may be filtered out by the update system 102. As such, the events may not be included in the update. For example, all day events (e.g., events that do not have a specified start or end time), events lasting longer than a certain period of time (e.g., four hours, five hours, etc.), and/or events marked as "free" (e.g., free events scheduled in the calendar services 206) may be filtered out from inclusion in the update. In additional examples, other events may also be filtered out based on system requirements, user preferences, and the like.

As an example of the tagging services configured to be performed by the tagging component 216, the content service 204 may determine that two events determined from the calendar services 206 are occurring at conflicting times. As such, the content tagging component 216 may tag each event as having a conflict. In other examples, the content service 204 may determine that an event determined from the calendar services 206 has been canceled. As such, the content tagging component 216 may tag the event as canceled. Still further, the content service 204 may determine that an event determined from the calendar services 206 has been not been replied to by the user. As such, the content tagging component 216 may tag the event as not yet having a reply, or un-replied.

After each event has been tagged, the content ranker component 214 may rank each event to be included in the update according to their tags. For example, the content ranker component 214 may be configured to rank each event according to the priority with which they should be briefed to the user. In some examples, the events may be ranked according to chronological order. For example, the events are of the same priority (e.g., have the same tags and/or no tags associated), the content ranker component 214 may rank the events according to their occurrence chronologically. In additional examples, the events may be ranked first according to chronological order (e.g., according to a time/date associated and/or tags indicating a time/date), with the additional tags being considered after the chronological ranking in order to determine a final ranking. By having a content ranker component 214 as its own component of the update system 102, the update system 102 is able to quickly and efficiently determine and update rankings of the events when new events are scheduled, when user preferences change, etc.

According to some implementations, the ranking may occur according to other priorities. For example, the generated update, or voice response 120, may include a first event occurring in the next twenty-four hours, followed by additional events occurring in the next four hours. In this example, the ranking of events may be prioritized such that the first event occurring (e.g., the first chronological event such as a scheduled event, a new event, a canceled event, or reminder) is listed first in the update. Next, the update may include events occurring during a certain time period after the voice command 112 is uttered, such as the four hours following the command 112. The events occurring during the next four hours may be ranked according to the tags associated with each event. For example, the events may be ranked accordingly: a) first accepted or tentatively accepted event; b) if the first meeting does not have a conflict tag, second accepted or tentatively accepted event; c) new event; d) canceled event; e) missing location and/or bridge in meetings organized by the user 108; e) reminders; f) quorum issues in event organized by the user 108; and/or g) email from important contacts.

In some examples, the update may also include an option to receive additional updates. For example, the voice response 120 may prompt the user 108 with an additional statement of "Would you like to hear more?" The voice-controlled device 108 may be configured to receive additional voice commands, such as "yes" or "no." In response, the update service 114 may be configured to provide additional updates associated with additional events and/or additional detail/information regarding particular events. In some examples, the additional events may be ranked by the content ranker component 214 accordingly: a) newly scheduled events; b) recently canceled events; c) missing location and/or bridge in meetings organized by the user 108; d) reminders; e) quorum issues in event organized by the user 108; and/or f) email from important contacts.

In additional examples, the events may be ranked according to other prioritizations. For example, the content ranker component 214 may receive and/or access predetermined ranking settings from the update system 102. The ranking settings may indicate a priority with which tagged events should be ranked. For example, the settings may indicate that events having a conflict should be ranked higher than events missing information.

In still further examples, the content ranker component 214 may be configured to receive, access, and/or determine one or more user preferences associated with a user of the voice-controlled device 108. For example, based on historical user data, user preferences may be determined. As an example, if the user data indicates that the user has provided feedback data that updates listing conflicts were not helpful, the content ranker component 214 may adjust the ranking of events to associate a lower rank with events tagged as having a conflict. In some examples, the user may explicitly provide the update system 102 with preferences indicating the events that they would like to receive updates on. It should be appreciated that additional rankings and/or prioritization of events may be used by the content ranker component 214 in additional examples. It should also be appreciated that, in some examples, the content services 204 may be configured to be included in the work briefing service 202 or may be a stand-alone component, as depicted herein.

In examples, the update system 102 may be configured to include a work briefing service 202. The work briefing service 202 may be configured to generate and provide the updates to the user and store dialog for future use. For example, the work briefing service 202 may be configured to include a content renderer component 218 and/or a dialog storage component 220. For example, the content renderer component 218 may be configured to generate an update including the voice response 120 for output to the user. As an example, the content renderer component 218 may be configured to receive and/or access the ranked events from the content ranker component 214 and generate an update including a narration of the ranked events to the user. For example, the update may include the voice response 120 comprised of a listing of the ranked events and their associated information. The voice response 120 may be audibly output to the user via the voice-controlled device 108 and/or one or more user devices. In the event that the user has no events occurring, the content renderer component 218 may indicate that there are no upcoming events.

In other examples, the work briefing service 202 may include the dialog storage component 220. In some examples, the dialog storage component 220 may be configured to store the ranked event information for the duration of the update session. As a result, if the user indicates that they would like to hear more information and/or hear information relating to additional events, the update system 102 may efficiently and quickly provide the information in lieu of having to acquire the information from the content services 204 again. This may reduce latency in providing additional update information. In addition, by storing the session information as described herein, less processing power will be required to provide additional information as the user requests it. In some examples, the dialog storage component 220 may be configured to store the domain specific data, along with dialog, in an encrypted manner and along with a hash key that is unique for each dialog entry.

Figure 3:
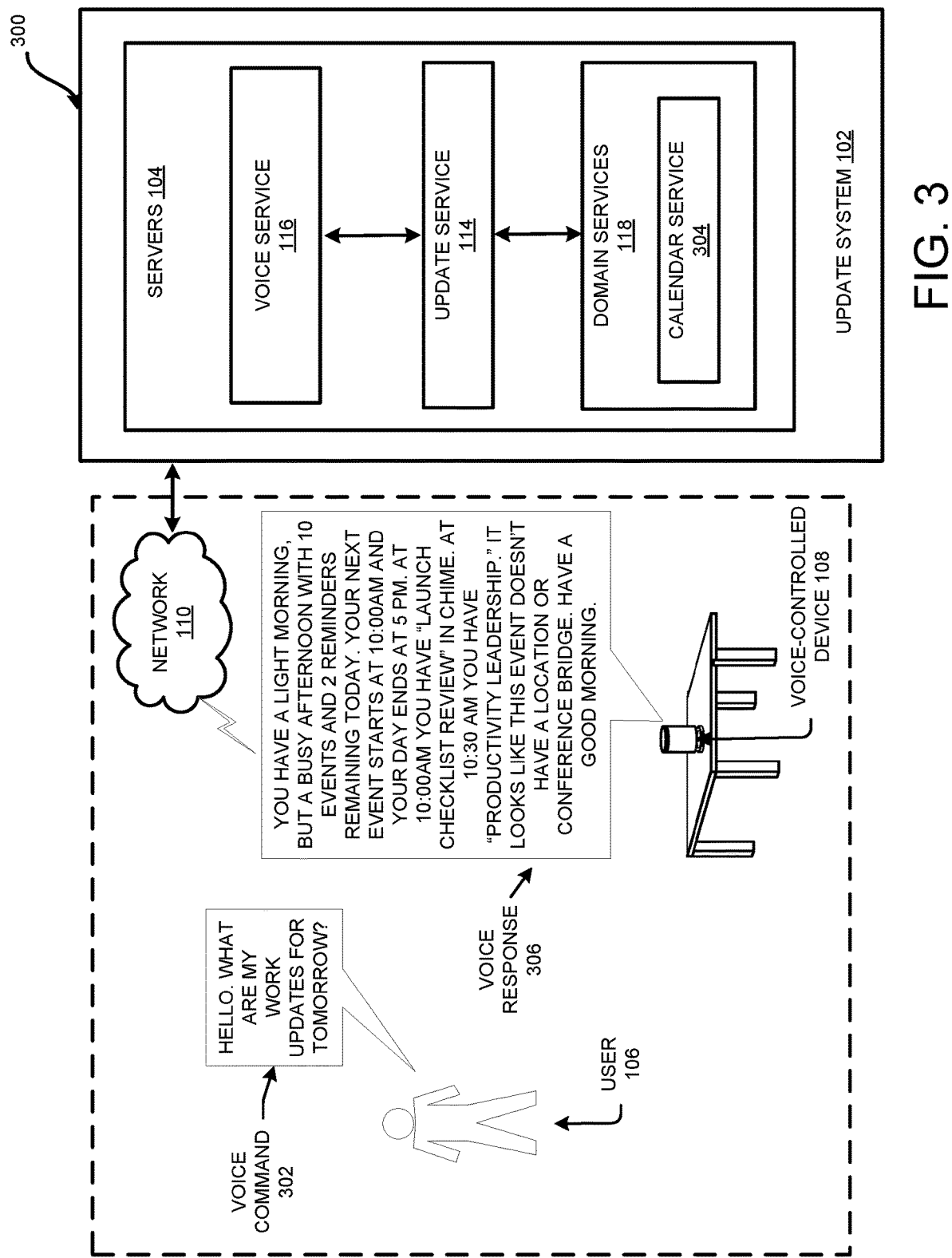
FIG. 3 is another software and network architecture diagram showing aspects of the configuration and utilization of the update system according to FIG. 1.

FIG. 3 is another software and network architecture diagram 300 showing aspects of the configuration and utilization of the update system 102 for interacting with the virtual assistant to receive event updates and perform actions. It is to be appreciated that the environment 300 is merely illustrative and that the various configurations disclosed herein can be utilized in many different types of computing environments.

In examples, the user 106 of the update system 102 can utilize the voice-controlled device 108 to access the update system 102 through a network 110. As described herein, the virtual assistant is configured to understand natural language voice commands and complete tasks for the user, such as receiving/providing update information. As shown in FIG. 3, the user 106 may interact with the voice-controlled device 108 within the environment 300 by using voice commands. For instance, if the user 108 would like to receive information regarding events occurring on the proceeding day, the user 108 may issue a voice command 302 to the voice-controlled device 108. In response to receiving the voice command 302, the voice-controlled device 108 may interact with one or more remote services to generate the updates and perform actions.

In the illustrated example, the user 108 has uttered the phrase, or voice command 302, "Hello. What are my work updates for tomorrow?" to the voice-controlled device 108. Upon receipt of the voice command 112, the voice-controlled device 108, and or the voice service 116, may apply speech recognition techniques to identify the intent of the voice command 112. For example, the voice command 112 may be transmitted, via the network 110, to the voice service 116 for processing. In examples, the processing may include identify an intent associated with the voice command 112, such as the request for a work update.

Upon recognizing the request for a work update, the service 114 may be configured to access various data sources, such as domain services 118 including the calendar service 304. In some examples, calendar service 304 may be configured to store information regarding one or more events that have been scheduled via the calendar service 304 associated with the user 106. For example, the calendar service 304 may include a calendar feature that allows the user 106 to create events and invite attendees to participate in the event. In other examples, the calendar service 304 may allow the user 106 to receive invites to attend events from third parties. In addition, the calendar service 304 may be configured to store information associated with the events, such as a time/date the event is scheduled for, a location of the event, a duration of the event, reply information associated with the user 106 and/or any other attendees, call in information for the event, and the like.

In examples, the calendar service 304 may provide the update service 114 with, and/or the update service 114 may access, event data associated with the one or more events occurring the proceeding day (e.g., the day after the voice command 302 has been received). In addition, the update service 114 may store a rules database (not shown) including rules for the calendar service 304. The rules may be utilized to tag each event occurring the proceeding day according to a condition associated with the event. For example, the rules may be utilized to tag an event according to the time/date, whether the event has a conflict, is missing information, has been canceled, has not been replied to, the duration of the event, and the like. Based on the tag(s) associated with the event, the update service 114 may rank the event(s) occurring during a time period according to their importance.

For example, as described herein, the ranking of events may be prioritized such that the first event occurring (e.g., the first chronological event such as a scheduled event, a new event, a canceled event, or reminder) is listed first in the update. Next, the update may include events occurring during a certain time period after the voice command 302 is uttered, such as the four hours following the command 302. The events occurring during the next four hours may be ranked according to the tags associated with each event. For example, the events may be ranked accordingly: a) first accepted or tentatively accepted event; b) if the first meeting does not have a conflict tag, second accepted or tentatively accepted event; c) new event; d) canceled event; e) missing location and/or bridge in meetings organized by the user 108; e) reminders; f) quorum issues in event organized by the user 108; and/or g) email from important contacts.

In this example, the update service 114 may determine that two events are occurring during the following day. For example, a first meeting including a call, hosted via a service (e.g., Chime®) at LOAM may be determined from the calendar service 304 and a second meeting at 10:30 AM may be determined. Based on the rules associated with the calendar service 304, the first meeting may be tagged as occurring first and the second meeting may be tagged as occurring second and missing information, such as a location, conference bridge, and the like. According to some examples, the first meeting may be ranked with a higher priority than the second meeting, according to the ranking described herein. The update service 114 may further determine additional data associated with the events, such as a name/title of the event, a duration, etc.

As such, the update service 114 may generate a voice response 306 including an update that provides information associated with the first meeting prior to providing information associated with the second meeting. For example, the voice response 306 may be audibly provided via one or more microphones of the voice-controlled device 108, such as an audible statement saying "You have a light morning, but a busy afternoon with 10 events and 2 reminders remaining today. Your next event starts at 10:00 am and your day ends at 5 PM. At 10:00 am you have "Launch Checklist Review"

in Chime. At 10:30 AM you have "Productivity Leadership." In this way, the update service 114 may provide an update that includes prioritized information to the user 106.

In some examples, the ranking may further be determined based on user preferences, such as historical user interactions with the voice-controlled device 108 or user preferences provided by the user 106, in order to provide a personalized ranking associated with the user 106. For example, in this instance, the user 106 may have previously indicated that he/she wishes to receive information associated with events in which the first occurring event is listed first, followed by events having missing information. In other examples, the user preferences may be determined based on user interactions and/or user feedback. For example, the update system 102 may be configured to determine user feedback after updates have been provided. As an example, the update may include a prompt asking the user 106 if they found the update helpful (e.g., "did you find this information helpful?", "did you like/dislike this update?", etc.). Based on the feedback, the system may determine that the user prefers to hear information associated with certain events and/or prefers a certain ranking of events.

In addition, in some examples, the update service 114 may be configured to provide a recommendation and/or a prompt to allow the user 106 to resolve one or more conditions associated with the events. In this example, the update service 114 has tagged the 10:30 AM "Productivity Leadership" event as missing location and conference bridge information. As such, the generated update may include a statement prompting the user 106 to provide a location and/or conference bridge information for the event. For example, the voice response 306 provided in FIG. 3 may include a statement, and/or prompt, indicating that the meeting is missing information and asking the user 106 if he/she would like to provide a response including the missing information (e.g., "Should I add a conference bridge to your 'Productivity Leadership' event?"). In response, the user 106 may indicate whether or not they would like to provide a response and the voice-controlled device 108 may continue to interact with the user to receive response information and provide the response information to the calendar service 304 for updating the event information with the missing location.

In addition, or alternatively, if the update system 114 determines that more than three events, or some other predetermined number of events that the update is limited to, are occurring, the voice response 306 may include the three events and then prompt the user 106 to determine if the user 106 would like to hear information regarding additional events (e.g., "would you like to hear more?", "there are additional events happening today, would you like to hear them?", etc.).

In some examples, the update service 114 may determine that two events are occurring during the following day. For example, a first meeting including a call, hosted via a service (e.g., Chime) at LOAM may be determined from the calendar service 304 and two meeting happening at 10:30 AM may be determined. Based on the rules associated with the calendar service 304, the first meeting may be tagged as occurring first and the second and third meetings may be tagged as occurring second and having a conflict (e.g., they both are occur at 10:30 AM). According to some examples, the first meeting may be ranked with a higher priority that the second meeting, according to the ranking described herein.

As such, the update service 114 may generate a voice response 306 including an update that provides information associated with the first meeting prior to providing information associated with the second meeting. For example, the voice response 306 may be audibly provided via one or more microphones of the voice-controlled device 108, such as an audible statement saying "You have a busy day with 10 events and 2 reminders remaining today. Your next event starts at 10:00 am and your day end sat 5 PM. At 10:00 am you have "Launch Checklist Review" in Chime.

You have 2 conflicting meetings at 10:30 am. They are "Productivity Leadership" and a 1:1 meeting with John. Have a good morning." In this way, the update service 114 may provide an update that includes prioritized information to the user 106.

As described herein, in some examples, the update service 114 may be configured to provide a recommendation and/or a prompt to allow the user 106 to resolve one or more conditions associated with the events. In this example, the update service 114 has tagged the 10:30 AM "Productivity Leadership" event as having a conflict with a 1:1 meeting with John, also occurring at 10:30 AM. As such, the generated update may include a statement prompting the user 106 to reschedule at least one of the events occurring at 10:30 AM. For example, the voice response 306 provided in FIG. 3 may include a statement, and/or prompt, indicating that the two meetings at 10:30 AM have a conflict and asking the user 106 if he/she would like to reschedule (e.g., "Would you like me to reschedule your 1:1 with Maayan?", "By the way, you can ask me to reschedule 1:1 meetings, just say 'move my meeting with John'", etc.). In response, the user 106 may indicate whether or not they would like to provide a response. The voice-controlled device 108 may then continue to interact with the user to receive response information and provide the response information to the calendar service 304 for updating the event information for one or more events that the user 106 has indicated they would like to reschedule.

Figure 4:
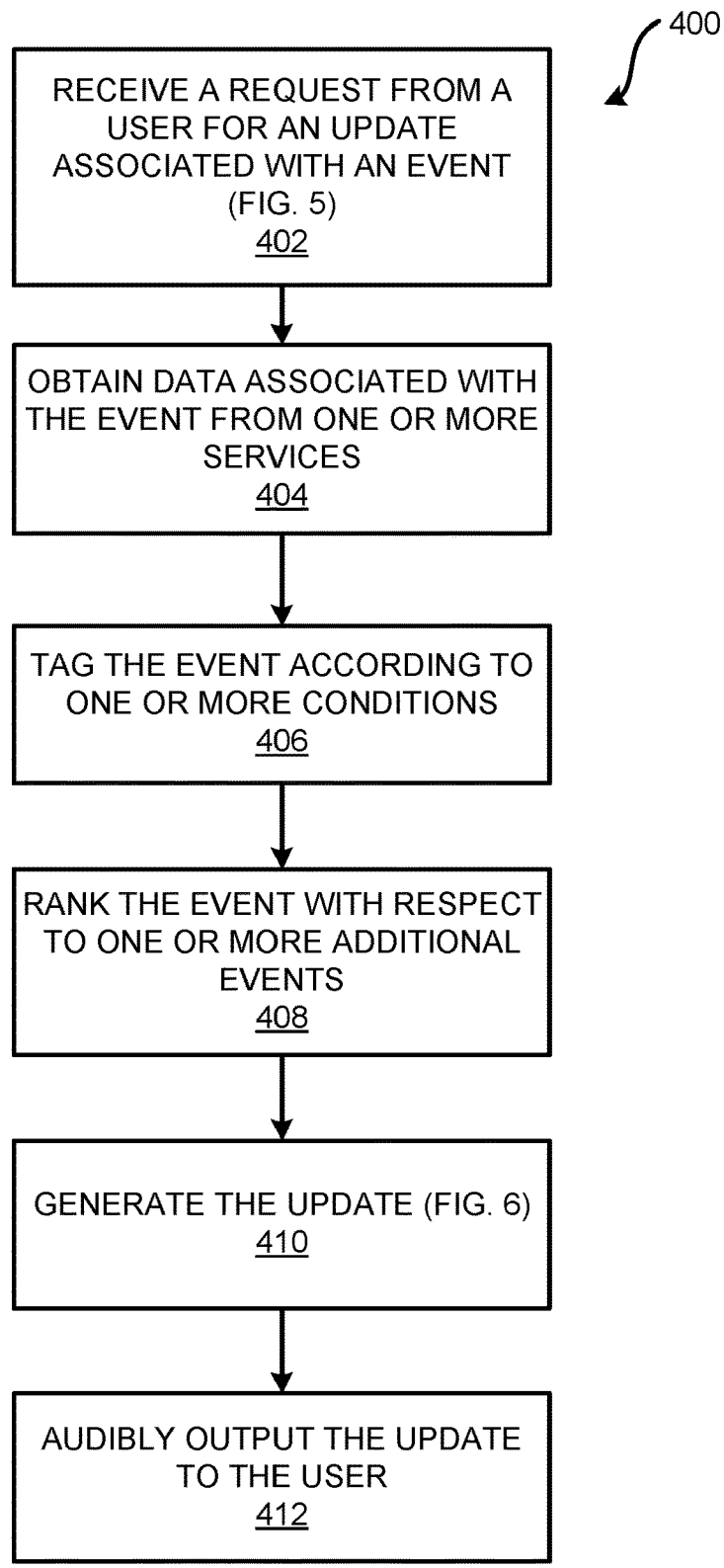
FIG. 4 is a flow diagram showing an illustrative routine for interacting with a virtual assistant to request updates.
Figure 5:
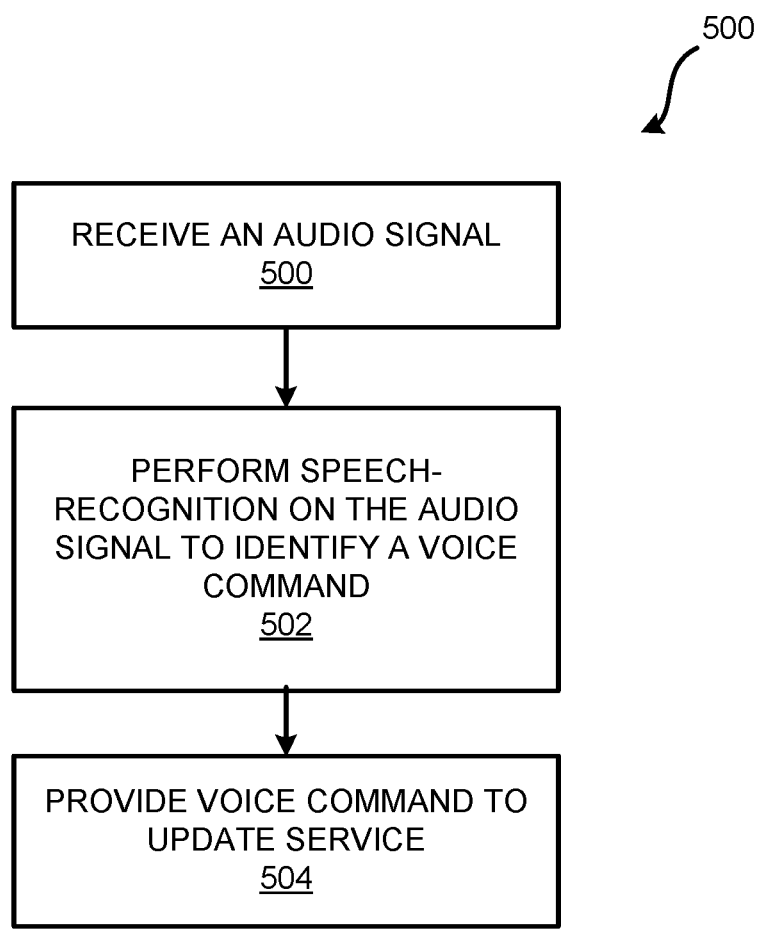
FIG. 5 is another flow diagram showing an illustrative routine for interacting with a virtual assistant to request updates.
Figure 6:
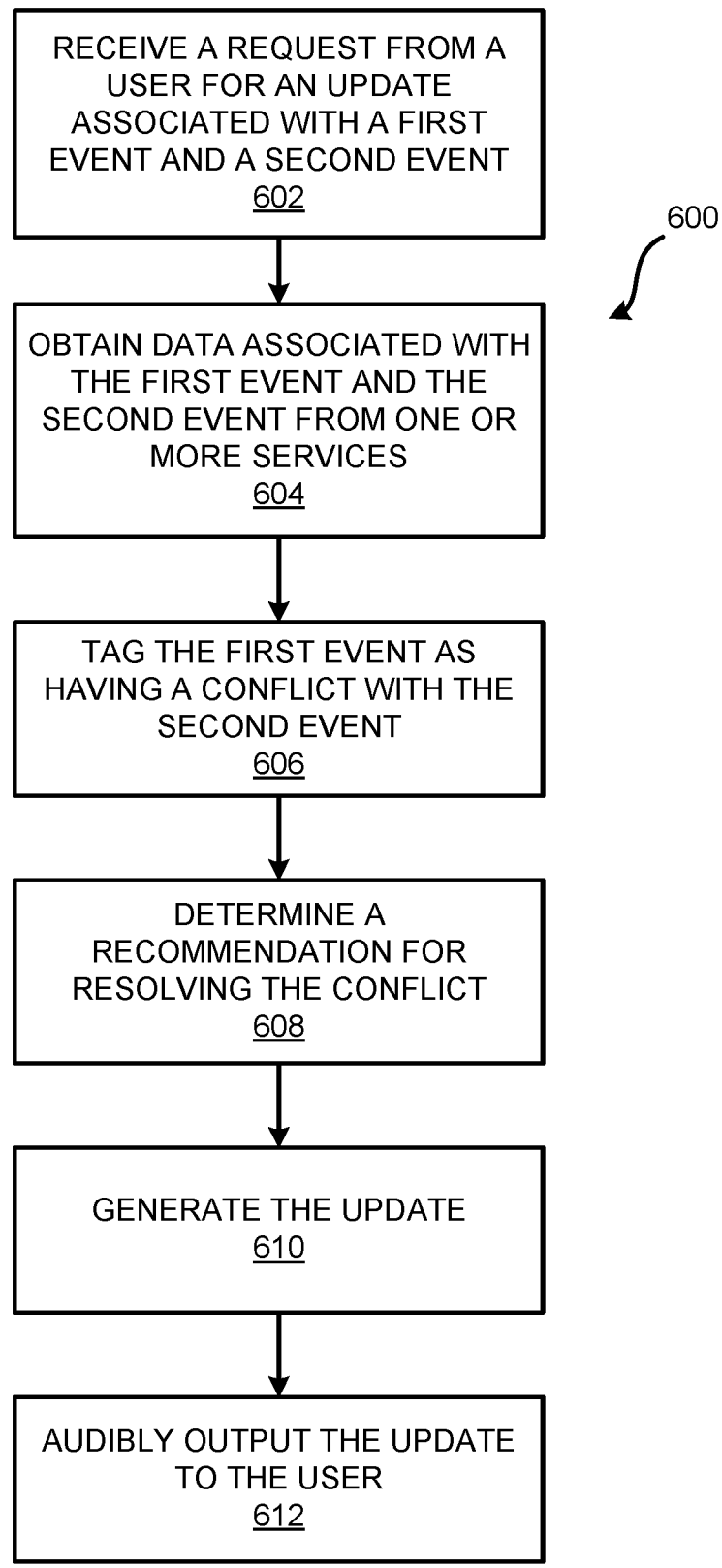
FIG. 6 is another flow diagram showing an illustrative routine for interacting with a virtual assistant to request updates.

FIGS. 4-6 are flow diagrams showing illustrative routines 400, 500, and 600 for interacting with a virtual assistant to receive updates, according to examples disclosed herein. It should be appreciated that the logical operations described herein with respect to FIG. 3-6, as well as the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 4 is a flow diagram showing an illustrative routine for receiving updates using a virtual assistant. At 402, a request for an update associated with an event is received from a requesting user 106. As discussed above, the user 108 may provide a voice command 112 that requests an update associated with one or more events occurring during a period of time, such as the next twenty-four hours. For example, the voice-controlled device 108 may receive the voice command 112 using speech uttered by the user 108. In other examples, the voice-controlled device 108 may automatically provide the update and/or ask the user 108 whether they would like to receive the update upon the voice-controlled device 108 awakening.

The voice command 112 may be audibly uttered by the user 106, which is captured by one or more microphones of the voice-controlled device 108. Regardless of how the voice command 112 is provided by the user 106, the voice-controlled device 108 and/or one or more components of the update system 102 may process the voice command 112, using one or more speech recognition techniques (ASR) and/or one or more natural language processing techniques (NLU) in order to determine an intent associated with the search voice command 112 (See FIG. 5).

At 404, the update system 102 may obtain data associated with the event from one or more services. For example, as described herein, the content service 204 of the update system 102 may be configured to communicate with the domain services 118 using one or more Application Programming Interfaces (APIs) exposed by one or more of the domain services 118. Alternatively, or in addition, in some examples, the content service 130 may also include a library that enables communication between the content service 130 and the domain services 118. In examples, the domain services 118 may include, but not be limited to, calendar services 206, email services 208, personal data services 210, and/or other services 212. From these domain services 118, the content service 204 may acquire data associated with the events including, but not limited to, time (e.g., the time the event is set to occur), date (e.g., the date the event is set to occur), duration (e.g., how long the event is scheduled to last), time of scheduling (e.g., when the event was created), cancelation information (e.g., whether the event has been canceled), reply information (e.g., whether the user and/or additional attendees have accepted, declined, or not yet replied to the event), location information (e.g., a location of the event), contact information (e.g., information for joining or attending the event, such as a conference call number), attendance information (e.g., invited persons), and the like.

At 406, the update system 102 may tag the event according to one or more conditions. For example, the content tagging component 216 of the update system 102 may include a rules database including rules for each domain service of the domain services 118. As such, each of the calendar services 206, email services 208, personal data services 210, and/or other services 212 may be associated with a rule that allows each event from each of the domain services 118 to be tagged according to one or more conditions associated with the events. As an example, the content service 204 may determine that an event determined from the email service 208 is missing a location. As such, the content tagging component 216 may tag each event as having missing information.

At 408, the update system 102 may rank the event with respect to one or more additional events. For example, the content ranker component 214 of the update system 102 may be configured to rank each event based on their tags and/or user preferences. For example, the content ranker component 214 may be configured to rank each event according to the priority with which they should be briefed to the user. In some examples, the events may be ranked according to chronological order. For example, the events are of the same priority (e.g., have the same tags and/or no tags associated), the content ranker component 214 may rank the events according to their occurrence chronologically. In other examples, the content ranker component 214 may be preconfigured to rank events according to predetermined weighted factors. For example, the content ranker component 214 may be configured to weight events having a conflict higher than events that have not been replied to. In still further examples, the content ranker component 214 may be configured to adjust the rankings according to one or more user preferences associated with a user of the voice-controlled device 108. For example, based on historical user data, it may be determined that the user 106 prefers to hear updates regarding canceled events before events having a conflict. As such, the content ranker component 214 may adjust the rankings to reflect that preference (e.g., ranking canceled events higher than an event with a conflict). In some examples, the user preferences may be determined via machine learning techniques based on historical and/or feedback data and/or may be explicitly provided by the user 106.

At 410, the update system 102 may generate the update. For example, as described herein, the work briefing service 202 of the update system 102 may be configured to generate and provide the updates to the user. For instance, the content renderer component 218 of the work briefing service 202 may be configured to generate an update including the voice response 120 for output to the user. As an example, the content renderer component 218 may be configured to receive and/or access the ranked events from the content ranker component 214 and generate an update including a narration of the ranked events to the user. For example, the update may include the voice response 120 comprised of a listing of the ranked events and their associated information.

At 412, the update system 102 may audibly output the update to the user. For example, the voice response 120 generated at 410 may be audibly output to the user via the voice-controlled device 108 and/or one or more user devices. In the event that the user has no events occurring, the content renderer component 218 may indicate that there are no upcoming events.

FIG. 5 is a flow diagram showing an illustrative routine 400 for processing an auditory input associated with a virtual assistant, according to examples disclosed herein. The routine 500 begins at 502, where an audio signal is received. In some configurations, the audio signal is received from a voice-controlled device 108. The audio signal may include a voice command 112 of a user requesting to receive update information.

At 504, speech-recognition on the audio signal is performed to identify the voice command 112 of the user 106. As discussed above, the voice-controlled device 108, the voice service 116, and/or some other component or device may determine whether the audio signal includes a voice command to receive update information and/or the audio signal includes additional information or requests.

At 504, data associated with the voice command is provided to the update service 114. For example, the voice service 114 may determine that the user 106 has requested an update associated with one or more events.

FIG. 6 is another flow diagram showing an illustrative routine 600 for generating an update, according to examples disclosed herein. At 602, a request for an update associated with a first event and a second event is received from a requesting user 106. As discussed above, the user 108 may provide a voice command 112 that requests an update associated with one or more events occurring during a period of time, such as the next twenty-four hours. For example, the voice-controlled device 108 may receive the voice command 112 using speech uttered by the user 108.

The voice command 112 may be audibly uttered by the user 106, which is captured by one or more microphones of the voice-controlled device 108. Regardless of how the voice command 112 is provided by the user 106, the voice-controlled device 108 and/or one or more components of the update system 102 may process the voice command 112, using one or more speech recognition techniques (ASR) and/or one or more natural language processing techniques (NLU) in order to determine an intent associated with the search voice command 112.

At 604, the update system 102 may obtain data associated with the first event and the second event from one or more services. For example, as described herein, the content service 204 of the update system 102 may be configured to communicate with the domain services 118 using one or more Application Programming Interfaces (APIs) exposed by one or more of the domain services 118. Alternatively, or in addition, in some examples, the content service 130 may also include a library that enables communication between the content service 130 and the domain services 118. In examples, the domain services 118 may include, but not be limited to, calendar services 206, email services 208, personal data services 210, and/or other services 212. From these domain services 118, the content service 204 may acquire data associated with the events including, but not limited to, time (e.g., the time the event is set to occur), date (e.g., the date the event is set to occur), duration (e.g., how long the event is scheduled to last), time of scheduling (e.g., when the event was created), cancelation information (e.g., whether the event has been canceled), reply information (e.g., whether the user and/or additional attendees have accepted, declined, or not yet replied to the event), location information (e.g., a location of the event), contact information (e.g., information for joining or attending the event, such as a conference call number), attendance information (e.g., invited persons), and the like.

At 606, the update system 102 may tag the first event as having a conflict with the second event. For example, the content tagging component 216 of the update system 102 may include a rules database including rules for each domain service of the domain services 118. As such, each of the services may be associated with a rule that allows each event from each of the domain services 118 to be tagged according to one or more conditions associated with the events. In this example, the content service 204 may determine that the first event and the second event are occurring at conflicting times. As such, the content tagging component 216 may tag the first event as having a conflict with the second event.

At 608, the update system 102 may determine a recommendation for resolving the conflict indicated by the tags associated with the first and second events. For example, the update system 102 may be configured to receive and/or access the tagging information from the content tagging component 216. Based on the tagging information, the update system 102 may determine that a conflict exists between the first event and the second event. As a result, the update system 102 may determine a recommendation for resolving the conflict. As an example, the update system 102 may recommend that at least one of the first event or the second event be rescheduled.

At 610, the update system 102 may generate the update. For example, as described herein, the work briefing service 202 of the update system 102 may be configured to generate and provide the updates to the user. For instance, the content renderer component 218 of the work briefing service 202 may be configured to generate an update including the voice response 120 for output to the user. As an example, the content renderer component 218 may be configured to receive and/or access the recommendation for resolving the conflict between the first event and the second event from the update system 102 and may be configured to generate a prompt. For example, the update may include the voice response 120 comprised of a prompt to the user to reschedule at least one of the first event or the second event.

At 612, the update system 102 may audibly output the update to the user. For example, the voice response 120 generated at 410 may be audibly output to the user via the voice-controlled device 108 and/or one or more user devices. In this example, the update may include the recommendation for resolving the conflict determined at 608.

Figure 7:
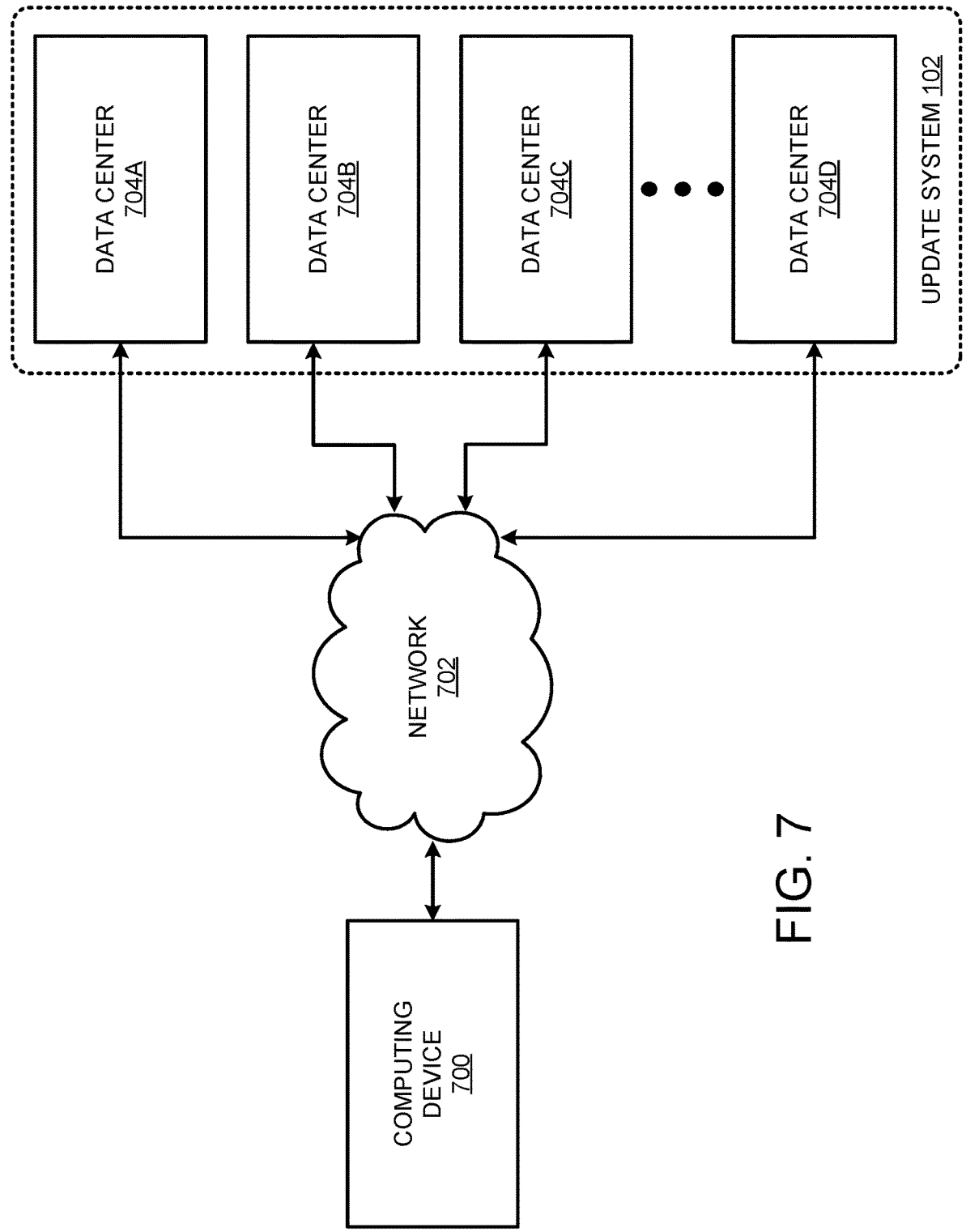
FIG. 7 is a system and network diagram that shows an illustrative operating environment including several data centers that can be configured to implement aspects of the functionality described herein.

FIG. 7 is a system and network diagram that shows one illustrative operating environment for the configurations disclosed herein that includes an update system 102 that can be configured to provide the functionality described above. As discussed above, the update system 102 can execute network services that provide computing resources for implementing the functionality disclosed herein. The computing resources implemented by the update system 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The update system 102 can also include and utilize other types of computing resources not mentioned specifically herein.

As also discussed above, the computing resources provided by the update system 102 are enabled in one implementation by one or more data centers 704A-704D (which might be referred to herein singularly as "a data center 704" or collectively as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative configuration for a data center 704 that can be utilized to implement the technologies disclosed herein will be described below with regard to FIG. 8.

The users can access the services provided by the update system 102 over a network 702, which can be a wide area communication network ("WAN"), such as the Internet, an intranet or an Internet service provider ("ISP") network or a combination of such networks. For example, and without limitation, a computing device 700 operated by a user or other user of the update system 102 can be utilized to access the update system 102 by way of the network 702. It should be appreciated that a local-area network ("LAN"), the Internet, or any other networking topology known in the art that connects the data centers 704 to remote users and other users can be utilized. It should also be appreciated that combinations of such networks can also be utilized.

Figure 8:
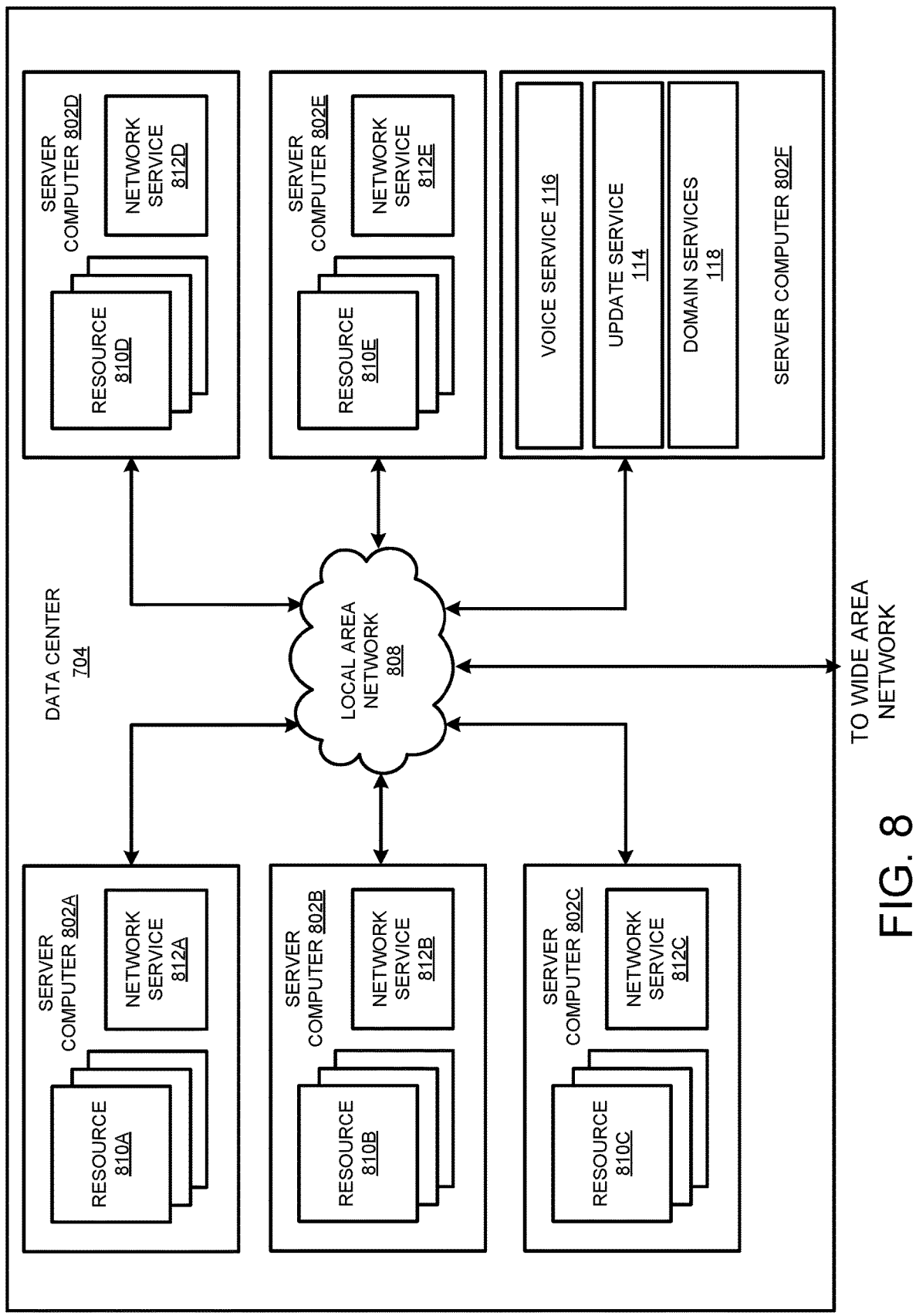
FIG. 8 is a computing system diagram illustrating a configuration for a data center that can be utilized to implement aspects of the technologies disclosed herein.

FIG. 8 is a computing system diagram that illustrates examples for a data center 704 that can be utilized to implement the voice service 116, the update service 114, domain services 118, and the other functionality disclosed herein. The example data center 704 shown in FIG. 8 includes several server computers 802A-802F (which might be referred to herein singularly as "a server computer 802" or in the plural as "the server computers 802").

The server computers 802 can be standard tower, rack-mount, or blade server computers configured appropriately for providing various types of computing resources 810 for implementing the functionality disclosed herein. As mentioned above, the computing resources 810 provided by the data center 804 can be data processing resources such as VM instances or hardware computing systems, data storage resources, database resources, networking resources, and others. Some of the servers 802 can also be configured to execute network services 812A-812-E, respectively, capable of instantiating, providing and/or managing the computing resources 810A-810E.

The data center 804 shown in FIG. 8 also includes a server computer 802F that can execute some or all of the software components described above. The server computer 802F can also be configured to execute other components and/or to store data for providing some or all of the functionality described herein. In this regard, it should be appreciated that components or different instances of the services can execute on many other physical or virtual servers in the data centers 804 in various configurations.

In the example data center 804 shown in FIG. 8, an appropriate LAN 808 is also utilized to interconnect the server computers 802A-802F. The LAN 808 is also connected to the network 802 illustrated in FIG. 8. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704D, between each of the server computers 802A-802F in each data center 804, and, potentially, between computing resources 810 in each of the data centers 804. It should be appreciated that the configuration of the data center 804 described with reference to FIG. 8 is merely illustrative and that other implementations can be utilized.

Figure 9:
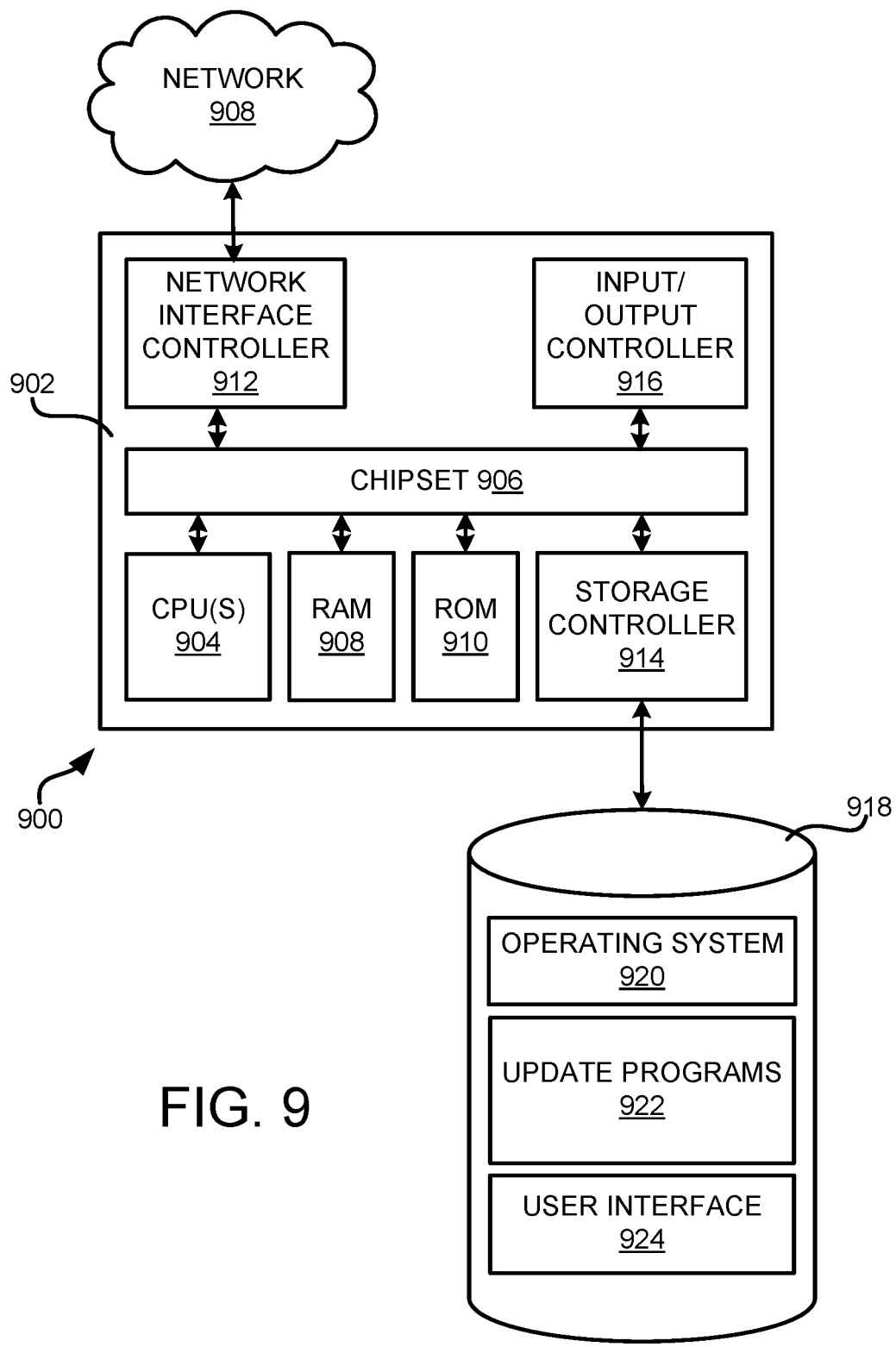
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 908. The chipset 906 can include functionality for providing network connectivity through a NIC 912, such as a gigabit Ethernet adapter. The NIC 912 is capable of connecting the computer 900 to other computing devices over the network 908. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, availability programs 922 for providing functionality associated with the availability system 102, user interface 924, and data, which have been described in greater detail herein. The mass storage device 917 can be connected to the computer 900 through a storage controller 914 connected to the chipset 906. The mass storage device 917 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 918 can store other system or application programs and data utilized by the computer 900.

In examples, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 704 transition between states, as described above. According to examples, the computer 700 has access to computer-readable storage media storing computer-executable instructions which, when executed by the computer 900, perform the various processes described above with regard to FIGS. 1-9. The computer 900 can also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Based on the foregoing, it should be appreciated that technologies for interacting with a virtual assistant to relay availability information have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
   one or more processors; and
   a non-transitory computer-readable storage medium having instructions stored thereupon which, when executed by the one or more processors, cause the system to perform operations comprising:
      receiving, from a voice-controlled device, an audio signal associated with speech uttered by a user, the audio signal being generated by one or more microphones of the voice-controlled device;
      applying at least one of automated speech recognition (ASR) or natural language processing (NLP) to the audio signal to identify one or more words included in the speech and an intent associated with the one or more words, the one or more words and the intent being associated with a voice command of the user requesting an update associated with an upcoming event that is associated with the user, wherein the voice command does not explicitly specify an identity of the upcoming event;
      obtaining, without using the identity of the upcoming event, data associated with the upcoming event from a plurality of services to utilize in generating the update, wherein the plurality of services include at least one of a calendar service, an email service, or a personal data service, the data including at least one of a date, a time, a location, a duration, contact information, a cancelation status, or an attendance associated with the upcoming event;
      identifying a rule associated with the plurality of services;
      determining a condition associated with the rule;
      assigning a tag to the upcoming event according to the rule and the condition;
      determining, based at least in part on the tag, a ranking of the upcoming event with respect to one or more additional upcoming events;
      generating, based at least in part on the ranking, the update, wherein the update includes the at least one of the date, the time, the location, the duration, the contact information, the cancelation status, the attendance, a conflict, or missing information associated with the upcoming event; and causing the update to be audibly output to the user via one or more speakers of the voice-controlled device.

2. The system of claim 1, wherein generating the update comprises:

obtaining additional data associated with the one or more additional upcoming events occurring during an event time period associated with the upcoming event, the additional data including times that individual upcoming events of the one or more additional upcoming events are occurring; and generating, based at least in part on the data and the additional data, a chronological list of upcoming events occurring during the event time period, the upcoming events including at least the upcoming event and the one or more additional upcoming events, wherein causing the update to be audibly output includes causing the chronological list to be audibly output to the user.

3. The system of claim 1, wherein the condition associated with the rule includes at least one of the time, the date, the conflict, missing location information, missing contact information, the duration, the cancelation status, or missing response information associated with the upcoming event.

4. The system of claim 3, wherein the operations further comprise:

determining a user preference associated with the user, the user preference based at least in part on historical interactions between the user and the voice-controlled device, wherein determining the ranking of the upcoming event is further based at least in part on the user preference.

5. The system of claim 3, wherein the operations further comprise:

obtaining, from the plurality of services, additional data associated with an additional upcoming event;

tagging the upcoming event as having the conflict with the additional upcoming event based at least in part on the data, the additional data, and the rule;

determining, based at least in part on the data and the additional data, a recommendation for resolving the conflict, wherein the update to be audibly output to the user further includes the recommendation.

6. A computer-implemented method comprising:

determining, based at least in part on an audio signal corresponding to audio captured by one or more microphones of a voice-controlled device, a voice command from a user requesting an update associated with a first event and a second event associated with the user, wherein the voice command does not include an identity associated with the first event or the second event;

accessing data from one or more services to utilize in generating the update, wherein the one or more services are configured to store information associated with the first event and the second event;

identifying a rule associated with the one or more services;

determining a condition associated with the rule;

assigning a first tag to the first event and a second tag to the second event according to the rule and the condition;

determining, based at least in part on the first tag and the second tag, a ranking of the first event with respect to the second event;

generating, based at least in part on the ranking, a listing of the first event and the second event;

generating the update, wherein the update includes the listing and indicates at least one of a date, a time, a conflict, missing information, or contact information associated with the first event and the second event; and causing the update to be audibly output via the voice-controlled device.

7. The computer-implemented method of claim 6, wherein the one or more services include at least one of a calendar service that maintains calendar data associated with the user, an email service that maintains e-mail data associated with the user, or a personal data service for reminders associated with the user.

8. The computer-implemented method of claim 6, wherein assigning the first tag to the first event includes tagging the first event as having a conflict with the second event, and the method further comprising:

determining, based at least in part on the data, a recommendation for resolving the conflict, wherein the update to be audibly output to the user further includes the recommendation.

9. The computer-implemented method of claim 6, wherein assigning the first tag to the first event includes tagging the first event as lacking a reply, and the method further comprising:

determining, based at least in part on the data, a recommendation to provide the reply, wherein the update to be audibly output to the user further includes the recommendation.

10. The computer-implemented method of claim 6, wherein the condition associated with the rule includes at least one of the time, the date, a scheduling conflict, missing location information, missing contact information, duration of the first event or the second event, a cancelation, or missing response information.

11. The computer-implemented method of claim 6, further comprising:

determining a user preference associated with the user, the user preference based at least in part on historical interactions between the user and the voice-controlled device, wherein determining the ranking of the first event with respect to the second event is further based at least in part on the user preference.

12. The computer-implemented method of claim 11, wherein the historical interactions include indications that the user likes or dislikes previous updates.

13. A system comprising:

one or more processors; and a non-transitory computer-readable storage medium having instructions stored thereupon which, when executed by the one or more processors, cause the system to perform operations comprising:

determining, by at least one of a voice-controlled device or one or more devices remote from the voice-controlled device, an audio signal associated with a user;

processing the audio signal to identify a voice command requesting an update associated with an upcoming event, wherein the voice command does not explicitly specify an identity of the upcoming event;

accessing, from one or more services, data associated with the upcoming event to utilize in generating the update, wherein the one or more services are configured to store information associated with the upcoming event;

identifying a rule associated with the one or more services;

determining a condition associated with the rule;

assigning a tag to the upcoming event according to the rule and the condition;

determining, based at least in part on the tag, a ranking of the upcoming event with respect to one or more additional upcoming events;

generating, based at least in part on the ranking, a listing of the upcoming event and the one or more additional upcoming events;

generating, based at least in part on at least one of the data-ranking or the listing, the update; and causing the update to be audibly provided via the voice-controlled device.

14. The system of claim 13, wherein the upcoming event comprises a first upcoming event, the data comprises first data, the tag is a first tag, and the operations further comprising:

accessing, from the one or more services, second data associated with a second upcoming event to utilize in generating the update;

assigning a second tag to the second upcoming event according to the rule; and determining, based at least in part on the first tag and the second tag, the ranking of the first upcoming event with respect to the second upcoming event.

15. The system of claim 14, wherein the condition associated with the rule includes at least one of a time, a date, a scheduling conflict, missing location information, missing contact information, duration of the event, a cancelation, or missing response information.

16. The system of claim 15, wherein assigning the first tag and the second tag is further according to the condition.

17. The system of claim 14, the operations further comprising:

tagging the first upcoming event as having a conflict with the second upcoming event based at least in part on the first data, the second data, and the rule; and determining, based at least in part on the first data and the second data, a recommendation for resolving the conflict, wherein the update further includes the recommendation.

18. The system of claim 14, the operations further comprising:

tagging the first upcoming event as lacking a response based at least in part on the first data and the rule, wherein the update includes at least a prompt to accept or to decline the first upcoming event via the voice-controlled device or an additional device.

19. The system of claim 14, the operations further comprising tagging the first upcoming event as missing location information based at least in part on the first data and the rule, wherein the update includes at least a prompt to add a location to the first upcoming event via the voice-controlled device or an additional device.

20. The system of claim 14, the operations further comprising:

determining a user preference associated with the user, the user preference based at least in part on historical interactions between the user and the voice-controlled device, wherein determining the ranking of the event is further based at least in part on the user preference.

* * * * *